(12) United States Patent
Rufus et al.

(10) Patent No.: US 6,410,634 B2
(45) Date of Patent: *Jun. 25, 2002

(54) LOW GLOSS POLISH FORMULATIONS

(75) Inventors: Isaac B. Rufus, Newark, DE (US); Hao A. Chen, Chadds Ford, PA (US)

(73) Assignee: Mannington Mills, Inc., Salem, NJ (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/219,863

(22) Filed: Dec. 23, 1998

(51) Int. Cl.$^7$ ................................................ C08K 3/18
(52) U.S. Cl. ...................................................... 524/430
(58) Field of Search .......................................... 524/430

(56) References Cited

U.S. PATENT DOCUMENTS

| | | | |
|---|---|---|---|
| 3,773,545 A | 11/1973 | Erb et al. ..................... 117/64 |
| 3,839,253 A | * 10/1974 | Kershaw ..................... 260/29.6 |
| 3,859,120 A | 1/1975 | Schramm ..................... 117/132 |
| 3,904,791 A | 9/1975 | Iverson et al. ................. 117/8 |
| 3,932,311 A | * 1/1976 | Caldwell ..................... 252/514 |
| 3,937,811 A | * 2/1976 | Papantoniou ................. 424/64 |
| 3,983,529 A | 9/1976 | Langlois ........................ 340/5 |
| 4,017,662 A | 4/1977 | Gehman et al. ............. 428/443 |
| 4,210,693 A | 7/1980 | Regan et al. ................ 428/152 |
| 4,242,253 A | 12/1980 | Yallourakis ................... 260/40 |
| 4,314,924 A | 2/1982 | Haubennestel et al. .... 260/30.6 |
| 4,464,499 A | 8/1984 | Umemoto et al. .......... 524/230 |
| 4,517,330 A | * 5/1985 | Zdanowski et al. ......... 524/408 |
| 4,584,341 A | * 4/1986 | Huebner ..................... 524/837 |
| 4,618,645 A | * 10/1986 | Bauman ..................... 524/745 |
| 4,647,647 A | 3/1987 | Haubennestel et al. ....... 528/83 |
| 4,762,752 A | 8/1988 | Haubennestel et al. ..... 428/407 |
| 4,795,796 A | 1/1989 | Haubennestel et al. ....... 528/28 |
| 4,857,111 A | 8/1989 | Haubennestel et al. ..... 106/504 |
| 4,968,735 A | 11/1990 | Page et al. ..................... 524/55 |
| 5,116,639 A | 5/1992 | Kolk et al. ................. 427/54.1 |
| 5,147,921 A | * 9/1992 | Mallo ......................... 524/493 |
| 5,149,745 A | 9/1992 | Owens et al. ............... 525/366 |
| 5,151,218 A | 9/1992 | Haubennestel et al. ..... 252/351 |
| 5,225,170 A | 7/1993 | Kolk et al. ............... 422/186.3 |
| 5,258,448 A | * 11/1993 | Mallo ......................... 524/556 |
| 5,319,018 A | * 6/1994 | Owens ........................ 524/556 |
| 5,462,587 A | 10/1995 | Greenleaf et al. .............. 106/2 |
| 5,464,887 A | * 11/1995 | Scott .......................... 523/501 |
| 5,998,543 A | * 12/1999 | Collins ........................ 524/808 |
| 6,060,556 A | * 5/2000 | Collins ........................ 524/533 |

FOREIGN PATENT DOCUMENTS

| | | |
|---|---|---|
| EP | 0 120 712 A2 | 10/1984 |
| JP | 60219274 | 1/1985 |

OTHER PUBLICATIONS

Kirk–Othmer "Encyclopedia of Chemical Technology" Third Edition, vol. 18, pp. 321–328 (1982).
Advertisement "Our Gloss is Your Gain." DOMCO High and Low Gloss Polish.
Degussa Corporation, Technical Library, "Improve Flatting Efficiency of TS100 in Emulsions Using an Aqueous Ammonium Polyacrylate Paste."
Rohm and Haas Company, DURAPLUAS®3.
009667620 WPI Acc No.: 93–361171/199346 Abstract.
BYK Chemie, Product Information, Wetting and Dispersing Additives in the Coatings Industry, pp. 1–20.

* cited by examiner

*Primary Examiner*—Paul R. Michl
(74) *Attorney, Agent, or Firm*—Kilyk & Bowersox, P.L.L.C.

(57) ABSTRACT

A low gloss polish formulation is described which contains at least a polymeric film former, a non-abrasive flatting agent, and a solvent. The low gloss surface covering polish formulation can be used in a number of surface coverings such as floor and countertop surfaces. The low gloss surface covering polish formulation is especially useful for surface coverings having a low gloss or matte finish. Methods of making the low gloss polish formulation are also described.

32 Claims, 2 Drawing Sheets

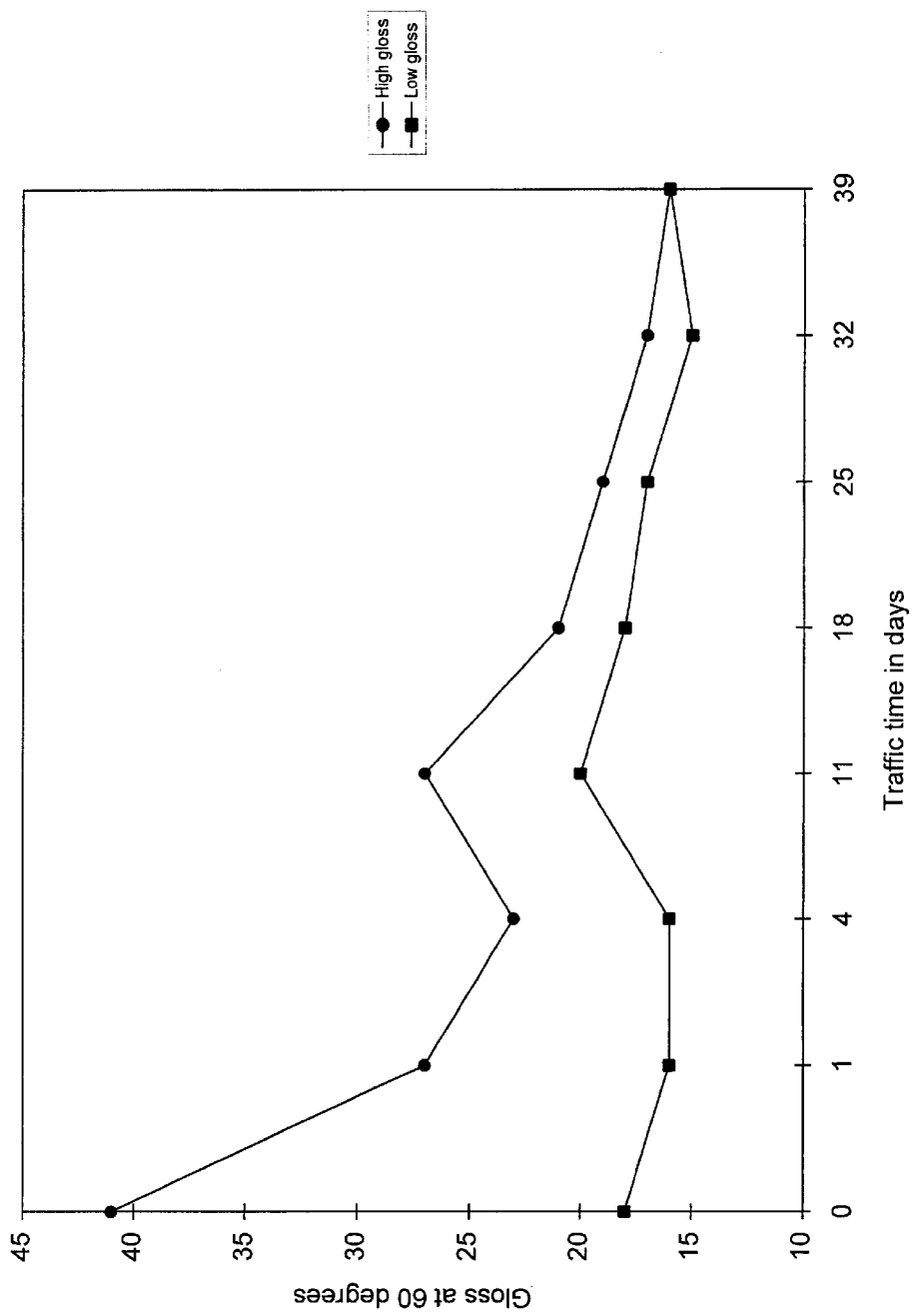
Figure 1 Gloss of the low gloss polish and high gloss polish as a function of foot traffic wear in a supermarket

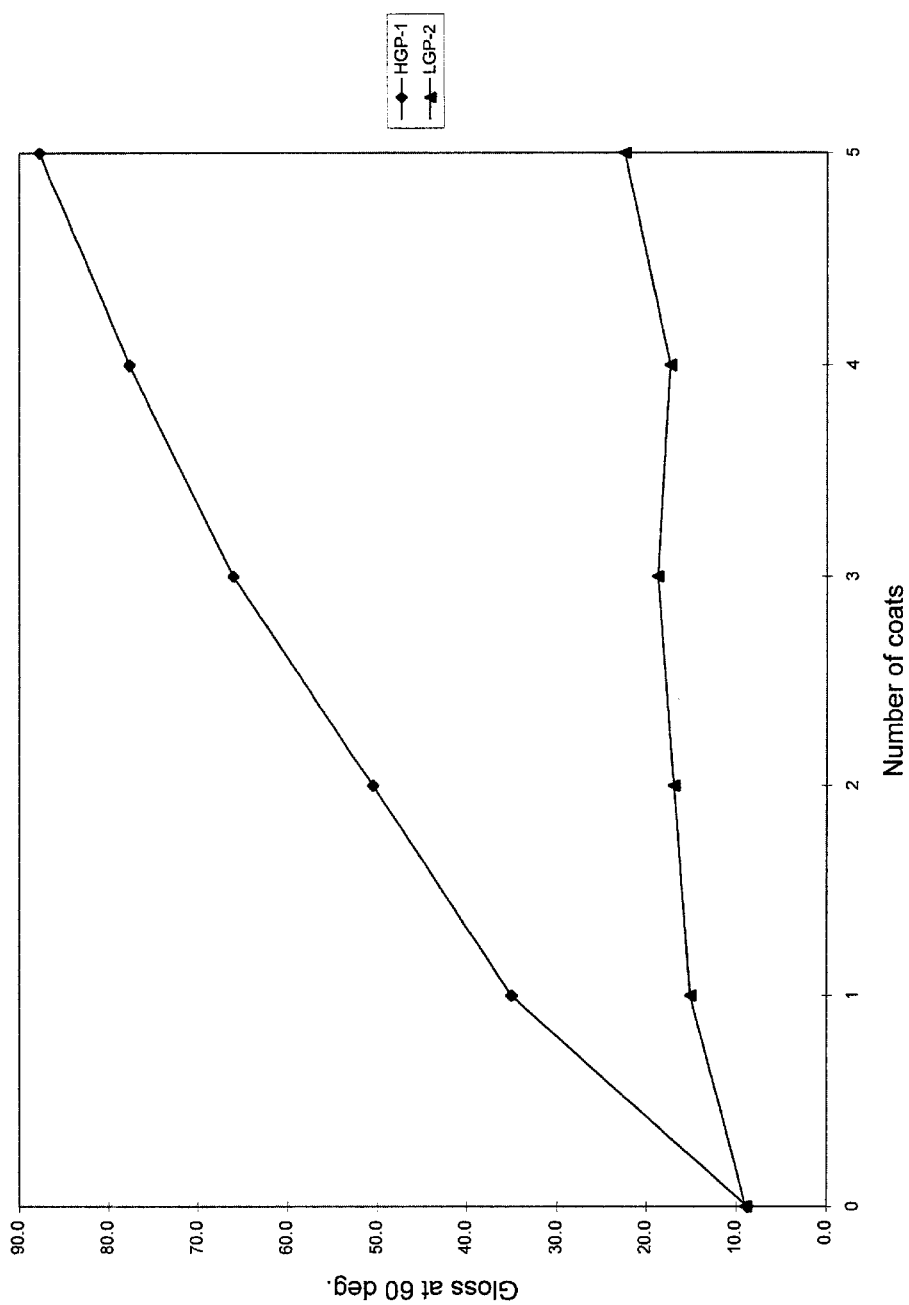
Figure 2 Gloss of the finish as a function of the number of coats of polish

US 6,410,634 B2

LOW GLOSS POLISH FORMULATIONS

BACKGROUND OF THE INVENTION

The present invention relates to polish formulations and in particular low gloss formulations which can be used with a variety of surface coverings. The present invention further relates to methods of making these formulations.

A polish or wax is normally applied to any worn surface to regenerate the surface and restore the gloss. The polish is typically associated with the shine of a surface. Usually, when a polish is applied to a worn surface, the shine or the gloss of the surface increases significantly. Conventional polishes which are available generally seek to create a smooth and clean surface as well as a glossy coating onto a variety of objects such as floor, furniture, and shoes. Car-polish formulas seek to achieve a glossy finish and protective film as well as remove weathered paint and soil with the use of abrasives in the polish. Also, a typical goal of a polish is to achieve a high gloss finish. However, this objective conflicts with surface coverings which have a low gloss or matte finish. A gloss which imparts a high gloss finish would alter the original appearance of the surface covering and thus be undesirable. Thus, there is a need for low gloss polish formulations which will achieve the effects of traditional polish formulations without imparting a high gloss finish. In other words, a low gloss polish formulation is desirable in order to maintain the original appearance of surface coverings and achieve the other benefits of a polish which are to regenerate the surface and restore the original gloss.

SUMMARY OF THE PRESENT INVENTION

A feature of the present invention is to provide a low gloss polish formulation for surface coverings.

Another feature of the present invention is to provide a polish formulation which does not alter the original gloss of the surface covering after it is applied.

A further feature of the present invention is to provide the ability to suspend flatting agent in the polish formulation without hard sediment.

Another feature of the present invention is to provide a low gloss polish formulation which is capable of matching the original gloss of a low gloss or matte finish surface covering.

Additional features and advantages of the present invention will be set forth in part in the description which follows, and in part will be apparent from the description, or may be learned by practice of the present invention. The objectives and other advantages of the present invention will be realized and obtained by means of the elements and the combinations particularly pointed out in the written description and appended claims.

To achieve these and other advantages and in accordance with the purpose of the present invention, as embodied and broadly described herein, the present invention relates to a low gloss surface covering polish formulation comprising at least one metal cross-linked polymeric film former; at least one non-abrasive flatting agent; and at least one liquid vehicle. The low gloss surface covering polish formulation can contain a variety of additional, but optional ingredients which include at least one suspension aid, at least one leveling aid, at least one coalescent, at least one plasticizer, at least one wetting agent, at least one emulsifying agent, at least one alkali-soluble resin, at least one wax, or combinations of any of these ingredients. Other optional ingredients can also be present such as at least one defoamer, at least one biocide, at least one surfactant, and the like.

The present invention also relates to a low gloss floor polish formulation which preferably imparts a gloss of from about 1 to about 40 and more preferably from about 5 to about 30 based on a 60° glossmeter.

It is to be understood that both the foregoing general description and the following detailed description are exemplary and explanatory only and are intended to provide further explanation of the present invention, as claimed.

BRIEF DESCRIPTION OF THE DRAWINGS

FIG. 1 is a graph comparing the gloss retention over time for a low gloss polish of the present invention.

FIG. 2 is a graph comparing the gloss of a substrate as a function of the number of coats of a low gloss polish or high gloss polish applied.

DETAILED DESCRIPTION OF THE PRESENT INVENTION

In an embodiment of the present invention, a low gloss surface covering polish formulation is described. The low gloss surface covering polish formulation contains at least one metal cross-linked polymeric film former, at least one non-abrasive flatting agent, and at least one liquid vehicle, such as a solvent. The low gloss surface covering polish formulation preferably also contains at least one suspension aid and/or at least one leveling aid. In addition, the low gloss surface covering polish formulation can contain one or more types of an alkali-soluble resin, a coalescent, a plasticizer, a wetting agent, an emulsifying agent, wax, or combinations thereof. Thus, the low gloss surface covering polish formulation can contain one or more of these optional ingredients. In addition, the low gloss surface covering polish formulation can optionally contain one or more types of a defoamer, a biocide, a surfactant, or combinations thereof.

For purposes of the present invention, a surface covering includes, but is not limited to, flooring, wallpaper, automobile dashboards, automotive coatings, furniture coatings, countertops, and any other covering which can benefit from the application of a low gloss surface covering polish. Preferably, the surface covering is a flooring material such as a thermoplastic flooring material like vinyl flooring or resilient flooring. The surface covering can also be a wood covering such as wood flooring and laminate flooring, and the like.

With respect to low gloss, low gloss is based on a 60° glossmeter reading and preferably low gloss is any reading below 45 and more preferably a gloss of from about 1 to about 40, and more preferably a gloss of from about 3 to about 35, and most preferably a gloss reading of from about 5 to about 25, or from about 10 to about 20. Generally, the surface covering receiving the polish formulation of the present invention would have a gloss in these ranges as well, and thus the finish or top coat on the surface coverings can be characterized as having a matte finish or dull finish.

With respect to the metal cross-linked polymeric film former, any number of film formers can be used in combination. Any conventional polymeric film former found in polish formulations especially those found in floor polish formulations can be used and include acrylic polymers which are preferably cross-linkable with metal (e.g., zinc). Examples of suitable polymeric film formers which can be used in the present invention include, but are not limited to, polymers produced from ethylenically unsaturated monomers, such as styrene, acrylic acid or methacrylic acid esters of aliphatic C[1–8]alcohols, acrylonitrile, vinyl acetate, acrylic acid and methacrylic acid. Poly(meth)acrylates of two or more of these monomers, which may optionally contain other monomers in small quantities, can also be used. Other metal cross-linked polymeric film formers include polymers containing 1 to 30 parts by weight of monomers containing carboxylic acid groups, 30 to 70 parts by weight of monomers which form homopolymers having glass transition temperatures below 20° C., such as esters of acrylic acid with C[1–8] alcohols and/or methacrylic acid with C[4–8] alcohols and 30 to 70 parts by weight of monomers which form homopolymers having glass transition temperatures above room temperature, such as methacrylic acid esters of C[1–3] alcohols or styrene. Where several different polymer compounds of the type mentioned above are used in the form of a mixture, the film forming temperature determined for the mixture should be between 0° and 70° C. The film forming temperatures mentioned above apply to the plasticizer-free system, i.e. to the polymers with no other additives.

Examples of such film forming polymers are the following commercial products available as dispersions include: Syntran 1501 (Interpolymer), Primal 644 (Rohm & Haas), Neocryl A 1049 (ICI), Rhoplex® (metal-cross-linked acrylic polymer) and Duraplus® (mixed-metal cross-linked acrylic polymer). Other examples of polymeric film formers include acrylic-styrene based polymers.

The metal-cross-linked polymeric film former is present in an amount effective to form a film on a surface covering. Generally, the amount of metal-crosslinked polymeric film former present in the polish formulation is from about 5 to about 90% by weight of the polish formulation, and more preferably from about 20 to about 75%, and most preferably from about 25 to about 60% by weight of the polish formulation.

The non-abrasive flatting agent is any agent capable of controlling the gloss of a polish formulation. In more detail, the non-abrasive flatting agent has the ability to essentially lower the gloss of the polish formulation. Preferably, the non-abrasive flatting agent is a non-abrasive silica or non-abrasive aluminum oxide or a non-abrasive organic compound such as a polypropylene oxide. Preferably, the non-abrasive flatting agent is precipitated silica, fumed silica, or precipitated or fumed aluminum oxide, or combinations thereof. The non-abrasive quality of the flatting agent relates to the ability of the flatting agent to impart a low gloss without being abrasive to the surface covering as well as without feeling abrasive when touched after its application. The non-abrasive flatting agent preferably has a particle size of no more than about 40 microns and preferably ranges from about 1 micron to about 30 microns, and more preferably ranges from about 1 micron to about 20 microns and most preferably ranges from about 1 micron to about 15 micron in size. The amount of the flatting agent depends on the desired gloss of the polish formulation as well as the type of flatting agent used. The lower the gloss desired, the higher amount of flatting agent is needed. For instance, if precipitated silica is used as a flatting agent, to achieve a gloss of about 30, the flatting agent would have to be present in an amount of from about 0.75 to about 1.25% by weight based on the total weight of the formulation. As another example, if the level of gloss in a polish formulation is to be from about 10 to about 20, the amount of the flatting agent when precipitated silica would be from about 1.4% to about 2% by weight in the polish formulation. Generally, the amount of flatting agent present will range from about 0.2 to about 6% and more preferably from about 0.3 to about 4% by weight of the polish formulation.

It is preferred that a suspension agent be used with the flatting agent in order to maintain the flatting agent in suspension in the polish formulation for extended periods of time. Preferably, a suspension aid like alkylammonium salt of polycarboxylic acid could be used. Examples of such a compound include polycarboxylic acid alkanolamides or polyamidocarboxylic acid alkanolamides. Specific examples of such suspension aids are set forth in U.S. Pat. No. 4,857,111 which is incorporated in its entirety by reference herein. Suspension aids such as alkylammonium salt of lower molecular weight polycarboxylic acid (e.g., Disper-byk from BYK Chemie) or higher molecular weight unsaturated polycarboxylic acid (e.g., BYK-P 105 from BYK Chemie) or any other suitable suspension aid can be used to disperse the flatting agent.

The amount of suspension aid present in the polish formulation, if used, is generally based on the amount of flatting agent present and the type of flatting agent present. Generally, the suspension aid is preferably present in an amount sufficient to substantially suspend the flatting agent in the polish formulation for at least 10 weeks and preferably at least 26 weeks. The flatting agent is preferably stable to at least 1, 2, or at least 3 freeze/thaw cycles. No hard settling of the flatting agent should occur during storage or freeze/thaw cycles. The amount of suspension aid is generally from about 0.5% to about 6% by weight of flatting agent present in the polish formulation and more preferably from about 1% to about 5% by weight of flatting agent present in the polish formulation. The suspension aid is preferably dispersed in the polish before adding the flatting agent.

With respect to the liquid vehicle in the polish formulation, the liquid vehicle can be water based and/or solvent-aqueous-based. Preferably, the liquid vehicle is water-based or other environmentally friendly solvents. Generally, the amount of liquid present will be sufficient to keep all ingredients in solution. Preferably, the amount of liquid present is from about 15 to about 90% by weight based on the weight of the formulation and more preferably from about 20 to about 80 weight % based on the weight of the formulation.

The leveling aid which can be used assists in achieving a smooth polish film surface after application of the polish especially when multiple applications of the polish are used. Examples of leveling agents include, but are not limited to, phosphate esters and other phosphate containing compounds. Specific examples include, but are not limited to, tris(butoxyethyl) phosphate, and the like.

The leveling agent can be used in any effective amount to achieve a smooth polish film surface after application of the polish. Generally, the amount of leveling agent, if used, can range from about 0.5 to about 6% by weight, more preferably from 0.6 to about 4% by weight, and most preferably from about 0.7 to about 3.5% by weight based on the weight of the polish formulation.

Another ingredient that can be present in the polish formulation is a plasticizer which is used in some instances to soften a floor polish film. Examples of plasticizers include, but are not limited to, phthalate, adipates, sedacete esters, and polyols. Specific examples include, but are not limited to dibutyl phthalates. Generally, the amount of plasticizer present, if used, is enough to facilitate the flexibility and toughness of the polymeric film former once dried. Preferably, the plasticizer is present in amounts from about 0.2 to about 4% and more preferably from about 0.4 to about 2%, based on the weight of the polish formulation.

A wetting agent can also be present in the polish formulation of the present invention. The wetting agent assists in reducing the surface tension to below 30 dynes/cm of the polish formulation and assists in its wet-out on floor covering surfaces during its application. Examples of wetting agents include, but are not limited, to fluorocarbons and silicones. Specific examples of wetting agents include but are not limited to ammonium perfluoroalkyl sulfonate. The wetting agent can be applied in any conventional amount and preferably the wetting agent is present in amounts of from about 0.2 to about 3 weight % and more preferably from about 0.5 to about 2 weight % based on the weight of the polish formulation.

Wax, such as hard wax and/or soft wax, can also be present in the polish formulation of the present invention. The wax component can be any traditional waxes found in polish formulations. Preferably a hard wax and soft wax are present in the polish formulation of the present invention. Synthetic or natural waxes can be used. Examples include but are not limited to, polyethylene waxes, oxidized polyethylene waxes, montanester waxes, paraffin waxes, candellila waxes, and carnauba waxes. Mixtures of various waxes can also be used. The waxes can be present in amounts ranging from about 5% to about 30% and more preferably from about 10% to about 20% weight % based on the weight of the polish formulation. The presence of waxes is preferred since it assists in increasing the scuff resistance, black mark resistance, and slip resistance of the polish formulation.

A coalescent agent also can be present in the polish formulation of the present invention. The coalescent can assist in reducing the film-forming temperature and can further assist in creating a hard film by its nature to evaporate. Examples of coalescent agents include, but are not limited to, glycol ethers and some coalescents use a co-solvent like diethylene or dipropylene glycol ethers. The coalescent agent is preferably present in amounts ranging from about 1 to about 15% and more preferably from about 2 to about 10% by weight based on the weight of the polish formulation.

The components set forth in U.S. Pat. No. 4,017,662 can be used herein and this patent is incorporated it its entirety by reference herein.

The addition of solid particles like a flatting agent can interfere with the leveling of the polish. If the polish does not have good leveling properties, it will not form a smooth film and will have streaks or ridges after drying. This is not desirable, as this results in poor appearance. Especially when multiple coats are used, the leveling of the polish becomes important. Selection of the particle size is also important. Usually larger particles reduce the gloss effectively. However, they tend to cause some leveling problems. So the particles size of the flatting agent should be optimized to achieve good flatting efficiency as well as good leveling properties. As shown in the examples, the use of suspension aids or wetting agents in the premix improves the leveling of the polish. Further the amount of the leveling aid like tributoxyethyl phosphate in the formulation should be optimized to have the best possible leveling.

The performance of the low gloss polish of the present invention is preferably equal to that of the commercially available high gloss polish. The typical properties tested were: (1) gloss restoration (2) recoatability (3) soil resistance and surface protection (4) wear resistance (5) scuff resistance (6) water and detergent resistance (7) transport and storage stability (8) drying time (9) leveling (10) polish removability (11) coefficient of friction (12) gloss retention, etc. Addition of flatting agents, wetting agent or suspension aid to different gloss polish formulations, did not lower the performance of the low gloss polish.

Besides the above-described ingredients, other conventional additives can also be present such as defoamers, biocides, surfactants, and alkali-soluble resins. These various ingredients can be present in conventional amounts and the examples in the present application provide preferred ingredients and amounts.

As stated above, if a suspension aid is used it is preferred that that suspension aid be first mixed with the flatting agent as a separate mixture and then added to the various other ingredients of the polish formulation.

With respect to the preferred ingredients in the polish formulation of the present invention, the following ingredients are preferably added in the following order: 1) at least one biocide, 2) at least one wetting agent, 3) at least one coalescent, 4) at least one plasticizer, 5) at least one leveling agent, 6) at least one surfactant or surface active agent, 7) at least one polymer, 8) at least one alkali soluble resin, 9) at least one wax, 10) at least one defoamer, 11) at least one suspension aid, and 12) at least one flatting agent. The suspension acid and flatting can be added as a pre-mix with a liquid vehicle and a buffer. While this is the preferred method of addition, modifications to this sequence of addition could be made whenever necessary or desired. Typical formulations of the present invention have the following ingredients based on parts by weight of the polish formulation:

| Components | Typical Ranges (Wt. %) |
| --- | --- |
| Water | Depends on % solids |
| Wetting agent | 0.1–1.0 |
| Defoamer | 0.01–0.05 |
| Coalescent | 4.0–8.0 |
| Plasticizer | 0–2.0 |
| Leveling agent | 1.0–2.0 |
| Biocide | Minimum as required |
| Surfactant | 0.25–1.0 |
| Polymer | 25–75 |
| ASR | 0–10.0 |
| Hard wax | 1–15 |
| Soft wax | 1–15 |

Ingredients used in floor polish, their functions, chemical names and suppliers

| Trade Name | Function | Chemical Name | Supplier |
| --- | --- | --- | --- |
| Kathon CG/ICP (1.5%) | Preservative/ biocide | 5-chloro-2-methyl-4-isothiazolin-3-one (1.05–1.25%), 2-methyl-4-isothiazolin-3-one (0.25–0.45%), Magnesium chloride (0.5–1%), Magnesium nitrate (21–23%) and water 74–77% | Rohm and Haas Company, Philadelphia, PA |
| Acrysol 644 (42%) | Polymer | 33–35% acrylic polymer, 8–9% alkylaryl polyether alchol, 57–59% water, 0.1% max. aqueous ammonia | Rohm and Haas Company, Philadelphia, PA |
| Dowanol DPM | Coalescent | Dipropylene glycol monomethyl ether | Dow Chemical Co. Midland, MI |
| Caprolactam (50%) | Solvent/ Coalescent | 2-Oxohexa-methyleneimine | DSM Chemicals North America Inc. GA |

-continued

Ingredients used in floor polish, their functions, chemical names and suppliers

| Trade Name | Function | Chemical Name | Supplier |
|---|---|---|---|
| KP-140 | Leveling aid | Tributoxyethyl phosphate | Ashland Chemical Co., OH |
| Triton X-35 | Surface active agent | Octylphenoxypolyethoxyethanol nonionic surfactant | Union Carbide, TX |
| E-2968 M (38%) | Polymer | Acrylic Polymer 37–39% in water (Emulsion) | Rohm and Haas Company Philadelphia, PA |
| FC-120 | Wetting agent | A mixture of $C_{10}$ Ammonium Perfluoroalkyl Sulfonate (24%), $C_9$ Ammonium perfluoroalkyl sulfonate (3%), Diisopropyl ether (15%) in 39% water and 37.5% 2-butoxy ethanol | 3M, St. Paul MN |
| AC-325 N (35%) | Wax | nonionic polyethylene emulsion contains ethane, homopolymer, oxidized, potassium salt, water & nonyl phenoxy poly (ethoxyethanol) | Allied Chemical Corp. Morristown, NJ |
| SWS-211 or SE-21 | Defoamer | Aqueous emulsion of silicone fluid | Wacker Silicone Corp. Adrian, MI |
| Abex 18S (35%) | Surfactant stabilizer | Anionic surfactant 35% and water 65% | Rhone-Poulenc, Cranberry, NJ |
| Acrysol 1392 (40.5%) | Polymer | 38–42% polycarboxylate/styrene salt, 16–17% dipropylene glycol monomethyl ether, 45–46% water, 0.2% aqueous ammonia and styrene monomer <0.09 | Rohm and Haas Company Philadelphia, PA |
| Dowanol DE | Coalescent | Diethylene glycol ethylether | Dow Chemical Co., Midland, MI |
| Kodaflex TXIB | Coalescent | 2,2,4-trimethyl-1,3-pentanediol bis (2-methylpropanoate) | Eastman Chemical Kingsport, TN |
| HPDR (38%) | Polymer | Acrylic polymer (37–39%), residual monomers (0.1%), aqueous ammonia (0.1%) & water (61–63%) | Rohm and Haas Company, Philadelphia, PA |
| ASR Plus (35%) | Alkali soluble resin | Polycarboxylate/styrene salt (34–36%), residual monomers (0.1%), dipropylene glycol monomethylether (19–20%), aqueous ammonia (0.2%) & water (45–46%) | Rohm and Haas Company, Philadelphia, PA |
| AC-540N (30%) | Wax emulsion | Nonionic polyethylene emulsion contains water, 2-propenoic acid, polymer with ethane, nonyl phenoxy poly (ethoxyethanol) & potassium hydroxide | Chemical Corp. of America Chester, NY |
| BYK-156 | Dispersant/wetting agent | A solution of an ammonium salt of an acrylic acid copolymer. The solution contains 50% water | BYK Chemie USA, Wallingford, Connecticut |
| Acematt TS 100 | Flatting agent | Amorphous Fumed Silica | Degussa Corp. Springfield, NJ |
| GASIL HP39 | Flatting agent | Amorphous Synthetic Silicon dioxide (95%) & 5% water | Crossfield, Joliet, IL |

All percents (%) in Table are by weight

The present invention will be further clarified by the following examples, which are intended to be purely exemplary of the present invention.

EXAMPLES

The following formulations were used in the examples as indicated and were prepared by adding the various ingredients together and mixing for a sufficient time to create a dispersed polish formulation.

Formulation-A

| Ingredient | Weight (%) |
|---|---|
| Water | 53.7 |
| Kathon CG/ICP (1.5%) | 0.03 |
| Acrysol 644 (42%) | 3.42 |
| Dowanol DPM | 4.53 |
| Butyl Carbitol | 0.48 |
| Caprolactam (50%) | 2.8 |
| KP-140 | 0.50 |
| Triton X-35 | 0.96 |
| E-2968M (38%) | 28.96 |
| Aq. ammonia (28%) | 1.6 |
| FC-120 (1%) | 0.19 |
| AC-325N (35%) | 2.78 |
| SWS-211 | 0.05 |
| Total | 100 |

Adjust pH to 8.9; Total solids = 15.6%

Formulation B:

| Ingredient | Weight (%) |
|---|---|
| Water | 40.66 |
| Kathon CG/IGP (1.5%) | 0.03 |
| Abex 18S (35%) | 1.03 |
| Dowanol DE | 7.52 |
| KP-140 | 1.02 |
| Acrysol 1392 (40.5%) | 47.65 |
| Triton X-35 | 0.51 |
| FC-120 (1%) | 1.02 |
| Acetic Acid (100%) | 0.51 |
| SWS-211 | 0.05 |
| Total | 100 |

Total solids 21.1%

Formulation-II:

| Ingredient | Weight (%) |
|---|---|
| Water | 31.97 |
| Abex 18S | 0.50 |
| Kathon CG/ICP (1.5%) | 0.03 |
| FC-120 (25%) | 0.04 |
| Diethylene glycol ethyl ether (DE) | 5.67 |
| Kodaflex TXIB | 1.46 |
| KP-140 | 2.67 |
| HPDR (38%) | 49.58 |
| ASR Plus (35%) | 3.08 |
| AC-540N (30%) | 4.98 |
| SE-21 | 0.02 |
| Total | 100.00 |

Total solids 25.0%; Density 8.6 lbs/gal

| Formulation-III: | |
| --- | --- |
| Ingredient | Weight (%) |
| Water | 44.22 |
| Kathon CG/ICP (1.5%) | 0.03 |
| FC-120 (25%) | 0.03 |
| Diethlene glycol ethyl ether (DE) | 2.63 |
| Dipropylene glycol methyl ether (DPM) | 3.68 |
| Dibutyl phthalate | 1.05 |
| KP-140 | 1.58 |
| HPDR (38%) | 40.31 |
| ASR Plus (35%) | 2.35 |
| A-C 540N (30%) | 4.10 |
| SE-21 | 0.02 |
| Total | 100.00 |

Total solids 20.0%; Density 8.5 lbs/gal

Example 1

Effect of High and Low Gloss Polishes on a Low Gloss Floor Covering

| Substrate/Polish | Gloss at 60E |
| --- | --- |
| Inlaid floor covering no polish | 21.0 ± 0.6 |
| Inlaid floor with high gloss polish | 47.3 ± 2.5 |
| Inlaid floor with low gloss polish | 15.4 ± 0.3 |

As explained in the table above, the same type of inlaid vinyl floor covering was tested for the effects on polish finish. A high gloss polish (high gloss formulation-I) was applied, and to another portion of the inlaid floor no polish was applied, and to a third portion of the inlaid floor a low gloss polish was applied, wherein the low gloss polish contained the same ingredients as the high gloss polish formulation but with the addition of a silica flatting agent in the amount of 1.2% by weight of the polish formulation. The high gloss polish used was a polish formulation of the present invention but for the presence of a flatting agent. It is evident from example 1 that the low gloss polish effectively maintains or lowers the low gloss surface coverings such as low gloss inlaid floor covering. However the application of high gloss polish increases the gloss of the product and hence affects the esthetics of the floor covering. When a typical flatting agent like silica is added to the high gloss polish, the gloss can be lowered effectively. In the present case 1.2% by weight of silica (synthetic amorphous silicon dioxide viz., Gasil HP-39 from Crosfield Company, Joliet Ill., U.S.A.) was used.

Example 2

Effect of the Concentration of the Flatting Agent (Inorganic) on the Gloss Level of the Polish

| Amount of flatting agent % (wt) | Gloss of substrate before applying the polish | Gloss of substrate after applying the polish |
| --- | --- | --- |
| 1 | 21.1 ± 0.8 | 27.4 ± 5.6 |
| 2 | 21.5 ± 0.6 | 13.8 ± 1.2 |
| 3 | 19.6 ± 2.1 | 6.1 ± 0.1 |
| 4 | 18.3 ± 2.8 | 2.8 ± 1.2 |

In this example, the polish formulation in example 1 was used but for the amount of flattening agent present in the formulation. As shown in the table above, various amounts of flattening agent were incorporated into four samples of polish formulations to determine the effect that the polish had on the gloss of the surface in which it is applied. In this instance, an inlaid vinyl floor was used. As the amount of flattening agent is increased, the final gloss of the polish decreases. The desired gloss level can be achieved by properly selecting the amount of the flattening agent. In this particular example a typical inorganic flattening agent like silica (Gasil HP-39 from Crosfield Company) was used. In this case there was no hard settling and the flattening agent could be easily redispersed by shaking.

Example 3

Effect of Organic Flatting Agent on the Gloss of the Polish

| Amount of flatting agent % | Gloss of substrate before applying the finish | Gloss of substrate after applying the finish |
| --- | --- | --- |
| 1 | 19.7 ± 0.9 | 30.8 ± 1.6 |
| 2 | 22.5 ± 2.0 | 20.5 ± 0.3 |
| 4 | 23.9 ± 2.3 | 14.7 ± 2.2 |

In this example, oxidized polyethylene powder with an average particle size of 6 microns (Acumist A-6 from Allied Signal, Morristown, N.J., U.S.A.) was used as the flatting agent in the amounts indicated in the Table above with the same formulation in Example 1. In this case, as the flatting agent was lighter in weight than the polish, it started floating on the surface after about 24 hours. The stability of the system could be improved by using a predispersion of oxidized polyethylene. This example basically indicates that organic flatting agents could also be used to reduce the gloss of the polish.

Example 4

Effect of Using a Premix of the Flatting Agent

Use of a premix of the flatting agent increases the dispersion of the flatting agent. Treating the flatting agent (inorganic) with a solution of an ammonium salt of an acrylic acid copolymer (BYK-156) helps the leveling of the polish. In this case, amorphous fumed silica (Acematt TS 100 from Degussa Corp., Redfield Park, N.J.) was used.

| Ingredients[1] | Formulation-1 | Formulation-2 | Formulation-3 | Formulation-4 |
| --- | --- | --- | --- | --- |
| Water | 89.65% | 89.30% | 88.80% | 86.80% |
| Silica (TS-100) | 10.00% | 10.00% | 10.00% | 10.00% |

-continued

| Ingredients[1] | Formulation-1 | Formulation-2 | Formulation-3 | Formulation-4 |
|---|---|---|---|---|
| BYK-156 | 0.15% | 0.50% | 1.00% | 3.00% |
| Aq. Ammonia (28%) | 0.20% | 0.20% | 0.20% | 0.200% |

[1]Ingredients are by weight of total premix.

15% by weight of these four premixes were mixed with the high gloss formulation-III to lower the gloss to around 20–21 at 60°. Use of premix instead of adding the silica directly to the high gloss formulation imparted a better dispersion of the flatting agent. Also, addition of additives like BYK-156 assisted in the leveling of the polish. The preferred level of an ammonium salt of an acrylic acid copolymer in the premix is 1–30% by weight based on the amount of the flatting agent, more preferably 1–10%. The low gloss polishes prepared from premix formulation 1–3 with high gloss formulation-III exhibited good leveling properties.

The premixes were prepared by high shear mixing. Water was first added to the high shear mixture followed by aqueous ammonia and the ammonium salt of an acrylic acid copolymer, in this case BYK-156 (from BYK Chemie) was used. Finally, the required amount of the flatting agent was added in small quantities to the vortex of the high shear mixture and the mixing was continued until a homogeneous high viscous fluid was obtained.

The required amount of the premix was added to the polish formulation at low to medium shear to obtain the low gloss polish.

Example 5

Gloss of the Polish as a Function of the Amount of the Premix Present in the Polish Premix formulation-1 was used in this study and added to polish formulation I or III in the amounts indicated.
Substrate: Inlaid product-Impressions
Gloss was measured at 60°

| Weight % of premix in the polish | 5 | 7.5 | 8 | 10 | 15 |
|---|---|---|---|---|---|
| Gloss of polish formulation-I | 26.5 ± 0.4 | 22.1 ± 0.8 | 20.1 ± 3.4 | 14.2 ± 0.2 | — |
| Gloss of polish formulation-III | 35.8 ± 3.2 | 30.4 ± 3.2 | — | 26.7 ± 2.7 | 21.3 ± 0.7 |

This example shows that the gloss of the polish can be adjusted to the desired value by adding the required amount of the premix or predispersion. In this particular example the polish with a gloss of 20–22 matches well with the gloss of the substrate. This example further illustrates that the polish can be formulated to match any gloss level.

Example 6

Gloss of the Low Gloss Polish as a Function of Storage Time

Low Gloss Polish Formulation-A: Mixture of 15% by weight of Premix Formulation-3 and 85% by weight of High Gloss Polish Formulation-III.

Low Gloss Polish Formulation-B: Mixture of 12% by weight of Premix Formulation-3 and 88% by weight of High Gloss Formulation-III.
Formulation: Low Gloss formulation-A was used
Substrate: Inlaid—Impressions
Storage conditions: The polish was stored in 55 gal drum at room temperature.

Before sampling the polish any hard settling in the bottom of the drum was checked. The polish was stirred with a paddle and, applied onto a vinyl floor. The gloss (60°) of the substrate was recorded.

| Storage time of the low gloss polish | 60° Gloss |
|---|---|
| Initial | 21.8 ± 1.1 |
| After 28 days | 20.4 ± 0.6 |
| After 57 days | 24.2 ± 0.8 |
| After 92 days | 25.3 ± 0.1 |
| After 116 days | 19.7 ± 2.8 |

The results indicate that the gloss of the low gloss polish does not change significantly during storage. The low gloss polish should not have any hard settling due to storage or transportation. The different batches of low gloss polishes made in different amounts, like 1 pint to a gallon to 50 gallon batches are very stable. Even after 6 months no hard settling was observed. This is one of the most important properties of the low gloss polish. Any hard settling of the flatting agent will affect the gloss and the leveling of the polish and will beat the very purpose of the low gloss polish viz., the low gloss. If the flatting agent settles as a function of storage time, the gloss of the polish will also change as a function of time, which is not desirable. In this invention, this problem was avoided in one embodiment by using a proper wetting agent for the flatting agent and/or by using a suspension aid. Addition of the flatting agent in the form of a premix also assists to stabilize the low gloss formulation.

Example 7

Effect of Freeze/Thaw Cycles on the Properties of the Low Gloss Polish

The low gloss polishes tested were stable up to 3 freeze/thaw cycles (samples were not tested above 3 freeze/thaw cycles). This ensures that these polishes when shipped in different weather conditions and also when stored in varying conditions will be stable. Once the polish was frozen and then thawed to room temperature, the polish properties were restored.
Formulation used: Low gloss formulation-A
Substrate on which polish is coated: White VCT
The gloss was measured with BYK Gardner Gloss meter at 60°
The gloss was measured after one coat of the polish

| No. of freeze/thaw cycles | Gloss before applying the polish | Gloss after applying the polish | Settling |
|---|---|---|---|
| 0 | 12.4 ± 4.4 | 14.4 ± 2.5 | none |
| 1 | 13.5 ± 4.8 | 14.7 ± 1.9 | none |
| 2 | 13.0 ± 2.3 | 15.5 ± 1.7 | none |

During freeze/thaw stability testing the low gloss polish freezes. But when thaws at room temperature, there is no separation of layers or settling of the flatting agent or any sedimentation. Two freeze/thaw cycles did not affect the gloss of the polish significantly.

Example 8

Gloss Retention after Traffic Wear

Low Gloss formulation-B: (12% by weight premix formulation-3 and 88% by weight of high gloss polish formulation-III were mixed to form the low gloss formulation)

Three coats of this low gloss polish were applied on an Inlaid sheet in a typical coffee break room, where employees take coffee breaks and lunch breaks. The gloss and the coefficient of friction (dry) were measured as a function of time. This particular room sees a moderate foot traffic.

| Time/days | Gloss at 60° | COF (dry) |
|---|---|---|
| Initial | 30.5 ± 5.1 | 0.511 |
| After 81 days | 28.9 ± 1.2 | 0.508 |
| After 111 days | 27.2 ± 1.9 | 0.551 |

COF - Coefficient of friction (dry) was measured by NBA - Brungraber Tester made by Slip Test Inc. Brungraber Tester is used to measure COF, unless otherwise mentioned.

These test results indicate that the low gloss polish retains its gloss and the coefficient of friction as surface wear occurs on normal foot traffic.

Generally the COF values measured by NBS Brungraber Tester are slightly lower than those obtained by James machine. As NBS Brungraber Tester is a portable machine, it is used to measures the COF in the case of field installations. The COF measured on a James machine are higher than 0.5 and the values are given in the following table: One coat of polish on VCT

| Polish | COF - James machine |
|---|---|
| Low loss Polish Formulation-A | 0.6 |
| High Gloss Polish Formulation-III | 0.6 |
| Complete[a] | 0.6 |

[a]High gloss polish available from S. C. Johnson Wax

Several low gloss formulations made in the lab were tested for COF on a James machine. All of them had COF of higher than 0.5 and most of them had higher COF than the high gloss polish. In these low gloss formulations, flatting agents like precipitated or fumed amorphous silica were used. This example indicates that the addition of flatting agents like precipitated or fumed amorphous silica to reduce the gloss of the polish does not decrease the COF.

Example 9

Effect of Low Gloss Polish on the Stain Performance of Surface Covering with low Gloss Coating Low gloss formulation used: Formulation-A

| Properties | Low gloss surface-1 | Low gloss surface-2 | Low gloss surface-3 |
|---|---|---|---|
| Stain before applying low gloss polish | 5.0 | 8.5 | 12.0 |
| Stain after 1 coat of low gloss polish | 4.0 | 7.5 | 9.5 |
| Gloss before applying the polish | 15.4 ± 2.5 | 20.1 ± 1.9 | 13.3 ± 1.4 |
| Gloss after applying the polish | 19.8 ± 2.5 | 25.9 ± 0.6 | 15.1 ± 2.0 |

In all cases one coat of the low gloss polish was applied to a vinyl floor.

Stain: Common stainants like Mustard, Oil Brown, Shoe Polish, Iodine, Asphalt, Chemlawn and Sharpie Blue were used to test the products. The stains were applied on to the surface and after two hours they are removed and cleaned by solvents like mineral sprit and 2-propanol. Then each of the stains are rated from zero to 3. Zero being no stain and 3 being worst (dark) stain. To get the total stain rating all the seven individual stain ratings are added. Higher the total number, worse is the stain and vice-versa.

Low gloss surfaces 1–3 having different surface textures and were coated with two different polish formulations. Similarly 23 commercial/medical stains were also tested.
Low Gloss Polish Formulation: Formulation-A
Substrate: Inlaid sheet goods
High gloss polish: 25 Grand (S. C. Johnson Wax)
No of coats of polish: 3

| Properties | Before low or high gloss polish | After Low gloss polish | After high gloss polish |
|---|---|---|---|
| Gloss at 60° | 22.7 ± 0.9 | 33.4 ± 3.4 | 73.8 ± 3.8 |
| Stain after mild cleaning with 2-propanol | 23 | 48 | 50 |
| Stain after stripping the polish | Coating was not stripped | 1 | 8 |

These examples clearly indicate that low gloss polish protects surface coverings from stains. Low gloss polish provides slightly more protection than a typical high gloss polish.

This example also indicates that the low gloss polish effectively lowers the gloss of the finish even after 3 coats while the conventional polish increases the gloss of the product considerably. As the high gloss polish increases the gloss of the product significantly, the aesthetics of the low gloss surface covering is lost by the application of high gloss polish. Even though the particular low gloss formulation used in this example results in a slightly higher gloss than the original gloss of the product, the gloss of the low gloss polish could be further lowered to match the gloss of the product by reformulating (adding more flatting agent).

Example 10

Effect of Low Polish on Different Low Gloss Products

Low loss formulation-A was used.

| Products | Gloss before applying low gloss polish | Gloss after 1 coat of low gloss polish |
|---|---|---|
| Inlaid sheet goods with aggressive surface texturing with low gloss coating-1 | 15.3 ± 2.5 | 19.8 ± 2.5 |
| Inlaid sheet goods with moderate surface texturing with low gloss coating-2 | 20.3 ± 1.9 | 25.9 ± 0.6 |
| Inlaid sheet goods with smooth surface with low gloss coating-2 | 21.1 ± 0.5 | 29.0 ± 2.6 |
| PVC cushion product with surface texturing with low gloss coating-3 | 13.3 ± 1.4 | 15.1 ± 2.0 |
| PVC cushion product with slightly different surface texturing with low gloss coating-3 | 11.3 ± 1.8 | 11.5 ± 1.8 |

Gloss of the substrate was measured at 60°. This example illustrates that the low gloss polish could be used on a variety of low gloss substrates. These substrates have different low gloss ranges depending on the type of surface texturing and the coating. Sometimes, it may be difficult to exactly match the gloss of these wide variety of products with one low gloss formulation. So the low gloss polish should be formulated (the amount of flatting agent should be adjusted accordingly) to meet the specific gloss requirements of the different products. Coatings 1–3 are all low gloss radiation curable coatings with slightly different gloss ranges.

Example 11

Low gloss polish formulation-A was tested for 39 days on a heavily traveled floor and compared to a high gloss polish. During these 39 days, the low gloss polish and the high gloss polish were just mopped. Mopping did not affect any property or performance of the polish. As seen in FIG. 1, the low gloss polish retained its gloss even after 39 days of mopping. However, the gloss of the high gloss polish decreased considerably. On the 39th day part of the low gloss polish was mopped, part of it was scrubbed and part of it was burnished with a high speed (2000 rpm) propane operated buffer. The results are summarized below.

| Conditions | Gloss at 60° | Scuff Resistance | Black heel mark resistance | COF (dry) |
|---|---|---|---|---|
| Initial | 16 | Good | Good | 0.55 |
| 39th day | 16 | Good | Good | 0.55 |
| 39th day after mopping | 17 | — | — | 0.55 |
| 39th day after scrubbing | 12 | — | — | 0.58 |
| 39th day after burnishing | 20 | — | — | 0.59 |

COF - Coefficient of friction (dry) was measured by NBA - Brungraber Tester made by Slip Test Inc. Brungraber Tester is used to measure COF, unless otherwise mentioned.

This example indicates that the low gloss polish has good gloss retention. The COF was also maintained as a function of traffic wear. Scuff resistance and black heel mark resistance of the low gloss polish did not change as a function of traffic wear. As scrubbing usually causes some micro surface roughness, the gloss decreases upon scrubbing and as burnishing smoothness the surface, the gloss increases slightly upon burnishing. These differences in gloss levels did not cause a huge difference in the appearance of the low gloss polish. Scrubbing and burnishing could also be used to fine tune the final gloss level of the low gloss polish to a desired level. In general, this example indicates that regular maintenance procedures like mopping, scrubbing and burnishing did not affect the gloss level and the performance of the low gloss polish significantly. However, for better appearance retention, scrubbing and burnishing are not recommended. As the polish does not scuff, regular mopping will clean the polish.

Example 12

Effect of Multiple Coats of Polish on the Gloss of the Polish

In the case of conventional polish several coats of the polish (2–5 coats) are used to build up the gloss of the polish. In the following example the gloss of the different polishes were measured as a function of the number of coats:

| No. of coats | Gloss (at 60°) of High gloss polish-1 | Gloss (at 60°) of High gloss polish-2 | Gloss of (at 60°) of Low gloss polish-1 |
|---|---|---|---|
| 1 | 39 | 38 | 19 |
| 2 | 66 | 63 | 30 |
| 3 | 76 | 68 | 28 |
| 4 | 80 | 71 | 27 |
| Over night drying* | 62 | 60 | 24 |

*the gloss of the polishes were measured the next day i.e., after drying at room temperature in air for about 12–15 hours
High Gloss Polish-1: High Gloss Polish formulation-III
High Gloss Polish-2: Complete from S. C. Johnson Wax
Low Gloss Polish-1: Low Gloss formulation-A This example illustrates that the glosses of the conventional polishes increase considerably with the number of coats applied. But the increase in the gloss of the low gloss polish with the number of coats are not very high. After over night drying the gloss of the all the three polishes used in this example decrease. In real life situation, usually the final coat of the polish will dry over night. Thus after over night drying the gloss of the low gloss polish is very close the gloss of one coat. But in the case of the conventional high gloss polishes, there was a vast difference in the gloss of the first coat and fourth coat even after overnight drying. This is another unique property of the low gloss polish. i.e., the gloss of the loss polish should not be highly dependent on the number of coats. FIG. 2 also indicates the significant gloss difference between the high gloss polish and the low gloss polish as a function the number of coats.

Other embodiments of the present invention will be apparent to those skilled in the art from consideration of the present specification and practice of the present invention disclosed herein. It is intended that the present specification and examples be considered as exemplary only, with the true scope and spirit of the present invention being indicated by the following claims.

What is claimed is:

1. A low gloss surface covering polish formulation comprising:
   at least one metal cross-linked polymeric film former;
   at least one non-abrasive flatting agent; and
   at least one liquid vehicle solvent, wherein the non-abrasive solid flatting agent comprises a non-abrasive silica, a non-abrasive aluminum oxide, or mixtures thereof.

2. The formulation of claim 1, further comprising at least one suspension aid.

3. The formulation of claim 1, further comprising at least one leveling aid.

4. The formulation of claim 1, further comprising at least one suspension aid and at least one leveling aid.

5. The formulation of claim 1, further comprising at least one of the following ingredients: at least one alkali-soluble resin, at least one coalescent aid, at least one leveling aid, at least one plasticizer, at least one wetting agent, at least one emulsifying agent, at least one wax, at least one suspension aid, or combinations thereof.

6. The formulation of claim 5, further comprising at least one defoamer, at least one biocide, at least one surfactant, or combinations thereof.

7. The formulation of claim 2, wherein the total amount of non-abrasive flatting agent present is substantially suspended in the formulation.

8. The formulation of claim 1, wherein the flatting agent is precipitated silica, a fumed silica, or both.

9. The formulation of claim 1, wherein the metal cross-linked polymeric film former is a cross-linkable acrylic polymer.

10. The formulation of claim 1, wherein the liquid vehicle is an aqueous based vehicle.

11. The formulation of claim 1, wherein the metal cross-linked polymeric film former is present in the amount of from about 25 to about 90% by weight of formulation; the flatting agent is present in an amount of from about 30 to about 80% by weight of formulation; and the liquid vehicle is present in an amount of from about 20 to about 75% by weight of formulation.

12. The formulation of claim 5, wherein the resin is at least one acrylic polymer.

13. The formulation of claim 5, wherein the coalescent agent is ethylene glycol methyl ether.

14. The formulation of claim 5, wherein the leveling aid is tributoxy ethyl phosphate.

15. The formulation of claim 5, wherein the plasticizer is dibutyl phthalate.

16. The formulation of claim 5, wherein the wetting agent is ammonium perfluoroalkyl sulfonate.

17. The formulation of claim 5, wherein the wax is polyethylene based wax.

18. The formulation of claim 5, wherein the suspension aid comprises at least one ammonium salt of an acrylic acid copolymer or ammonium polyacrylate.

19. The formulation of claim 1, wherein the surface covering is a floor surface.

20. The formulation of claim 19, wherein the floor surface is a vinyl floor surface.

21. The formulation of claim 19, wherein the floor surface is a resilient floor surface.

22. The formulation of claim 19, wherein the floor surface is a thermoplastic floor surface.

23. The formulation of claim 19, wherein the floor surface is a wood floor surface.

24. The formulation of claim 1, wherein the surface covering is a countertop.

25. The formulation of claim 1, wherein the polish formulation imparts a gloss of from about 1 to about 40, based on a 60° glossmeter reading.

26. The formulation of claim 25, wherein the gloss is from about 1 to about 30.

27. The formulation of claim 25, wherein the gloss is from about 5 to about 20.

28. The formulation of claim 19, wherein the surface is a laminate floor surface.

29. The formulation of claim 19, wherein the surface is a tile floor surface.

30. The formulation of claim 19, wherein the surface is a vinyl composition tile floor surface.

31. The formulation of claim 19, wherein the surface is an inlaid floor surface.

32. The formulation of claim 7, wherein the non-abrasive flatting agent is substantially suspended in the formulation for at least 26 weeks.

* * * * *

UNITED STATES PATENT AND TRADEMARK OFFICE
CERTIFICATE OF CORRECTION

PATENT NO.    : 6,410,634 B2
DATED         : June 25, 2002
INVENTOR(S)   : Rufus et al.

It is certified that error appears in the above-identified patent and that said Letters Patent is hereby corrected as shown below:

<u>Column 17,</u>
Line 5, "non-abrasive flatting agent" should read -- non-abrasive solid flatting agent --.

Signed and Sealed this

Fifteenth Day of October, 2002

*Attest:*

*Attesting Officer*

JAMES E. ROGAN
*Director of the United States Patent and Trademark Office*